(12) United States Patent
Lee et al.

(10) Patent No.: US 7,013,061 B2
(45) Date of Patent: Mar. 14, 2006

(54) 2×2 OPTICAL SWITCHING APPARATUS USING PHOTONIC CRYSTAL STRUCTURES

(75) Inventors: Hong-seok Lee, Sungnam-si (KR); Suk-han Lee, Yongin-si (KR); Ji-deog Kim, Seoul (KR); Il-kwon Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 10/714,457

(22) Filed: Nov. 17, 2003

(65) Prior Publication Data
US 2004/0208426 A1   Oct. 21, 2004

(30) Foreign Application Priority Data
Nov. 15, 2002   (KR) ............... 10-2002-0071134

(51) Int. Cl.
*G02B 6/26* (2006.01)
(52) U.S. Cl. .................... 385/21; 385/16; 385/129
(58) Field of Classification Search .......... 385/1–10, 385/129
See application file for complete search history.

(56) References Cited

U.S. PATENT DOCUMENTS 6,456,416 B1   9/2002   Ichimura et al.

2002/0021878 A1   2/2002   Allan et al.
2002/0048422 A1 *   4/2002   Cotteverte et al. ............ 385/4

FOREIGN PATENT DOCUMENTS

| JP | 62-018524 | 1/1987 |
|----|-----------|--------|
| JP | 2001-091912 | 4/2001 |
| JP | 2002-131715 | 5/2002 |
| WO | WO 02/14913 A1 | 2/2002 |

* cited by examiner

*Primary Examiner*—Sung Pak
(74) *Attorney, Agent, or Firm*—Lee & Morse, P.C.

(57) ABSTRACT

A 2×2 optical switching apparatus using photonic crystal structures has a compact, simple structure and includes an optical-guide module having first, second, third and fourth waveguides, the first and second waveguides guiding a first optical signal of a first input port to a first and a second output port, respectively, the third and fourth waveguides guiding a second optical signal of a second input port to the second and the first output ports, respectively, and formed with photonic crystals having a complete photonic bandgap for a wavelength range of the first and second optical signals, and a switching control section controlling the first and second optical signals to be respectively guided through either a first/third waveguide route or a second/fourth waveguide route according to a route-selecting-control signal inputted from outside. The 2×2 optical switching apparatus has no mechanical motion, little polarization dependence and may be efficiently used in optical networks.

20 Claims, 4 Drawing Sheets

2×2 OPTICAL SWITCHING APPARATUS USING PHOTONIC CRYSTAL STRUCTURES

BACKGROUND

1. Field of the Invention

The present invention relates to an optical switching apparatus. More particularly, the present invention relates to a 2×2 optical switching apparatus using photonic crystal structures.

2. Description of the Related Art

Optical switching apparatuses have made it possible to considerably increase information processing speed and switching capacity and to overcome limitations of conventional electric switching technology. Optical switching apparatuses have become essential for optical communication, optical exchanging, optical processing, optical processes, optical computers and so forth.

Nowadays, with Internet capacity increasing by around four to five times per year, it is anticipated that information communication having an ultra large capacity of 100 Tb/s will be required within the next 10 years. However, the ability of today's technology to support such an ultra large capacity of information communication is unfortunately limited.

Today, in the optical network field, two kinds of switches are used. One, a free-space optical switch of a MEMS (Micro Electro Mechanical System) type, has advantages of multi-channel parallel processing and multi-channel connection, but has the basic disadvantage of slow switching time, i.e., a few ms to a few $\mu$s. The other switch that is currently used is a semiconductor switch of an optical waveguide type that has advantages of high-speed processing and relatively fast switching time, i.e., a few ns to a few ps, but has the basic disadvantage of delayed processing time in geometrical progression according to an increase of a number of channels. That is, in a case of a Wavelength Division Multiplexing (WDM) network constructed with 100 channels to have a transmission capacity of 100 Tb/s as described above, about 1 THz of transmission bandwidth is needed. However, there is no technology developed for such capability yet. Therefore, it is an urgent project to secure optical switching technology capable of processing a large capacity, i.e., 100 Tb/s, of information at a very high-speed, such as 1 THz, within the next few years.

In an optical network, application fields of optical switching include a protection switch, an optical add/drop multiplex (OADM), an optical crossconnect, etc., and particularly, a 2×2 optical switch may be used in access for line recovery and also as an OADM in a metro network.

The 2×2 optical switch, which has a structure connecting two input ports and two output ports, changes the connection state of the input ports and the output ports according to switching states. The representative technologies applied in the 2×2 optical switch at present are largely classified into bulk-mechanical/opto-mechanical technology, two dimensional micro electro mechanical systems (2D-MEMS) technology, thermo-optic waveguide technology and bubble technology.

The bulk-mechanical/opto-mechanical technology uses a method of changing optical route by using a motor, an electromagnetic-force driven device, or a piezo to directly drive an optical fiber, a mirror, or a lens. Therefore, the bulk-mechanical/opto-mechanical technology has disadvantages in that mechanical motions easily result in performance degradation of the moving sections, and elements used therein are expensive. The 2D-MEMS also has a problem in reliability guarantee because it too has a moving section. Meanwhile, the thermo-optic waveguide technology is profitable in mass production, but is affected by changes of ambient temperature and consumes relatively large power so as to generate heat. The bubble technology has bad optical properties, such as insertion loss, crosstalk and so forth.

SUMMARY OF THE INVENTION

In an effort to overcome the problems described above, it is a feature of an embodiment of the present invention to provide a 2×2 optical switching apparatus which is compact in size, has a simple structure, and has no mechanical motion by producing an optical-guide module and a switching control section in a single body, wherein the optical-guide module is made of photonic crystal and the switching control section is formed by inserting controllable photonic crystal into a region of the optical-guide module.

In an effort to provide these and other features and advantages, an embodiment of the present invention provides a 2×2 optical switching apparatus using photonic crystal structures, including an optical-guide module having a first, a second, a third and a fourth waveguide, the first and the second waveguides guiding a first optical signal of a first input port to a first and a second output port, respectively, the third and the fourth waveguides guiding a second optical signal of a second input port to the second and the first output port, respectively, and formed with photonic crystals having a complete photonic bandgap for a wavelength range of the first and the second optical signals, and a switching control section for controlling the first and the second optical signals to be respectively guided through any one route of a first/third waveguide route and a second/fourth waveguide route, according to a route-selecting-control signal inputted from outside the 2×2 optical switching apparatus.

Preferably, the optical-guide module and the switching control section are formed as a single body. Also, the switching control section preferably includes a first pair of switching-control segments wherein each one of the first pair is positioned in an inner area of a respective one of the first and the third waveguides and a second pair of switching-control segments wherein each one of the second pair is positioned in an inner area of a respective one of the second and the fourth waveguides, wherein any one pair of the first pair and the second pair of switching-control segments is selectively operated according to the route-selecting-control signal.

The switching control section may further include a photonic crystal having a controllable photonic bandgap, and a refractive index changing section for varying a refractive index of an inner substance of the photonic crystal according to the route-selecting-control signal.

Preferably, the refractive index changing section includes a temperature control section for outputting temperature control signals for controlling a temperature of the inner substance of the photonic crystal according to the route-selecting-control signal, and at least one heating device for changing the temperature of the inner substance of the photonic crystal according to the temperature control signals.

Alternatively, the refractive index changing section may include an electric field control section for outputting electric field control signals for controlling an electric field intensity of the inner substance of the photonic crystal according to the route-selecting-control signal, and at least one electrode plate for controlling an electric field of the inner substance of the photonic crystal according to the electric field control signals.

Alternatively, the refractive index changing section may include an optical intensity control section for outputting optical intensity control signals for controlling an intensity of optical signals to be applied to the inner substance of the photonic crystal according to the route-selecting-control signal, and at least one optical source for applying optical signals having the intensity corresponding to the optical intensity control signals to the inner substance of the photonic crystal.

Preferably, the switching control section further includes two pairs of photonic crystals having a complete photonic bandgap for a wavelength range of the first and the second optical signals, and a drive section for inserting and removing the two pairs of photonic crystals into and from the first, the second, the third and the fourth waveguides, respectively, according to the route-selecting-control signal. Preferably, the drive section for inserting and removing the two pairs of photonic crystals inserts each one of one pair of the photonic crystals into a respective one of each of the first and the third waveguides and removes each one of the other pair of the photonic crystals from each of the second and the fourth waveguides, respectively. However, alternatively the drive section for inserting and removing the two pairs of photonic crystals may remove each one of one pair of the photonic crystals from each of the first and the third waveguides, respectively, and may insert each one of the other pair of photonic crystals into a respective one of each of the second and the fourth waveguides.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Figure 1:
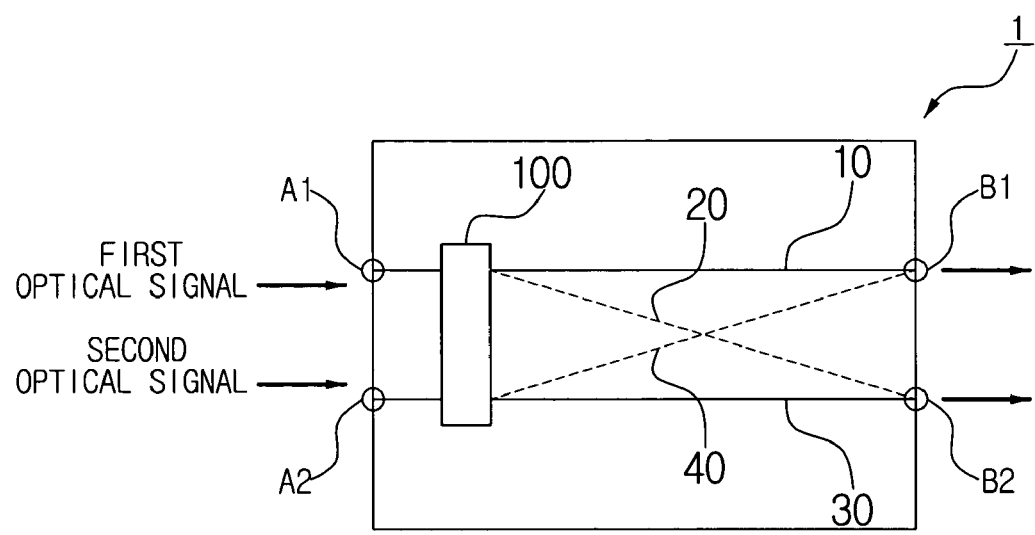
FIG. 1 illustrates a schematic view of a 2×2 optical switching apparatus using photonic crystal structures according to the present invention.

Korean Patent Application No. 2002-71134, filed on Nov. 15, 2002, and entitled: "2×2 Optical Switching Apparatus Using Photonic Crystal Structures," is incorporated by reference herein in its entirety.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

FIG. 1 illustrates a schematic view of a 2×2 optical switching apparatus according to the present invention. Referring to FIG. 1, the 2×2 optical switching apparatus includes an optical-guide apparatus 1 and a switching control section 100, in which the optical-guide apparatus 1 includes input ports A1 and A2, output ports B1 and B2, and waveguides 10, 20, 30 and 40.

In the 2×2 optical switching apparatus, it is possible that a first optical signal inputted to the first input port A1 is led to the first output port B1 and a second optical signal inputted to the second input port A2 is led to the second output port B2. It is also possible that a first optical signal inputted to the first input port A1 is led to the second output port B2 and a second optical signal inputted to the second input port A2 is led to the first output port B1.

The optical-guide apparatus 1 is formed with materials of photonic crystal structures having a complete photonic bandgap (PBG) for a frequency range of input optical signals, and has four waveguides 10, 20, 30 and 40, the insides of which are filled with a dielectric substance.

The first waveguide 10 guides a first optical signal inputted to the first input port A1 to the first output port B1, and the second waveguide 20 guides a first optical signal inputted to the first input port A1 to the second output port B2. Meanwhile, the third waveguide 30 guides a second optical signal inputted to the second input port A2 to the second output port B2, and the fourth waveguide 40 guides a second optical signal inputted to the second input port A2 to the first output port B1.

Figure 2A:
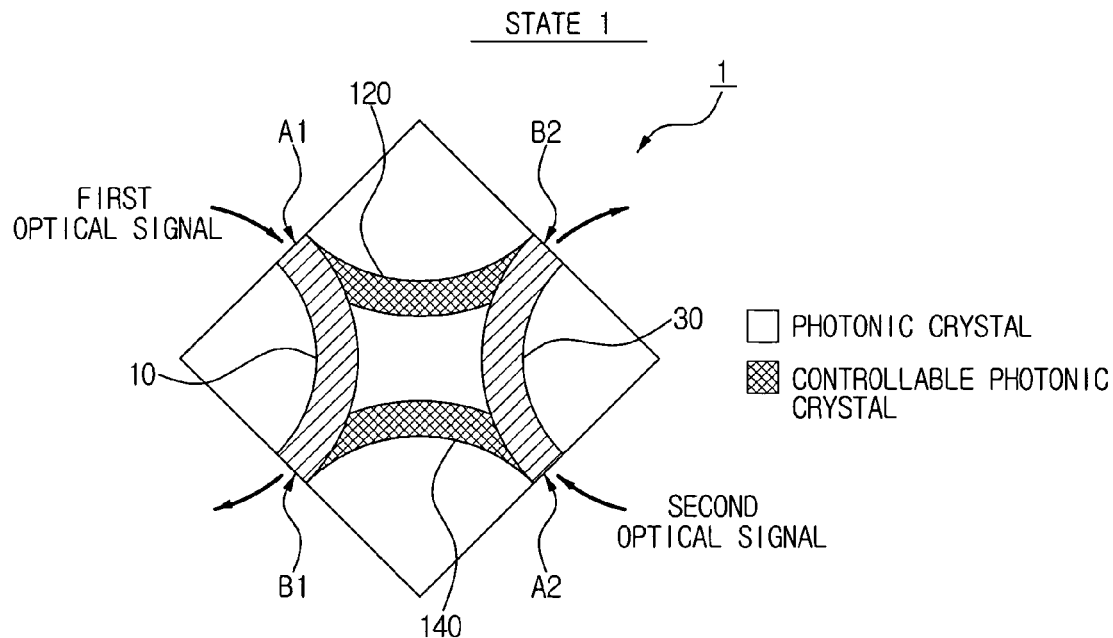
FIGS. 2A and 2B illustrate views of a switching state 1 and a switching state 2, respectively, in a 2×2 optical switching apparatus according to the present invention.
Figure 2B:
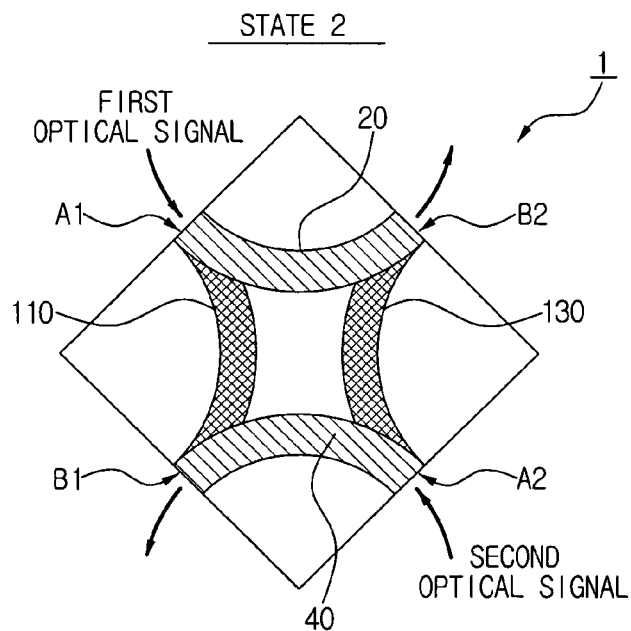

The switching control section 100 includes the four switching-control segments 110, 120, 130 and 140, as shown in FIGS. 2A and 2B, with each switching-control segment 110, 120, 130 and 140 being arranged to correspond to non-overlapping regions of each of the four waveguides 10, 20, 30 and 40, respectively. Referring to FIGS. 2A and 2B, the four switching-control segments 110, 120, 130 and 140 are grouped into pairs and selectively operated according to a route-selecting-control signal. That is, the route-selecting-control signal selectively operates a first pair of the switching-control segments, 110 and 130, and a second pair of the switching-control segments, 120 and 140.

The switching control section 100 performs a switching control so that the first and second optical signals inputted into the input ports A1 and A2 are led to different output ports, in which each output port is selected from the first and the second output ports B1 and B2 according to the route-selecting-control signal. That is, when the first optical signal is switched to the first output port B1 by the switching control section 100, the second optical signal is switched to the second output port B2. Similarly, when the first optical signal is switched to the second output port B2 by the switching control section 100, the second optical signal is switched to the first output port B1.

State 1 of FIG. 2A represents guiding routes for optical signals according to operation of the first pair of switching-control segments 110 and 130, in which a first optical signal inputted to the first input port A1 is guided to the first output port B1 through the first waveguide 10, and a second optical signal inputted to the second input port A2 is guided to the second output port B2 through the third waveguide 30.

State 2 of FIG. 2B represents guiding routes for optical signals according to operation of the second pair of switching-control segments 120 and 140, in which a first optical signal inputted to the first input port A1 is guided to the second output port B2 through the second waveguide 20, and a second optical signal inputted to the second input port A2 is guided to the first output port B1 through the forth waveguide 40.

The switching control section 100 includes a photonic crystal having a controllable photonic bandgap (PBG) and a refractive index changing section.

'Photonic crystal' refers to an artificial crystal that is produced so as to form a PBG in electromagnetic energy spectrum by periodically arranging substances having different dielectric constants from one another. When an electromagnetic wave having a wave belonging to the PBG is inputted into the photonic crystal, the electromagnetic wave cannot propagate into the substance, and is reflected. Therefore, the photonic crystal functions as an efficient reflection mirror. In other words, a general crystal is a natural crystal obtained through a periodic arrangement of atoms having an angstrom scale in nature, while the photonic crystal is an artificial crystal obtained by periodically arranging a substance of a bulk unit in a nano/micro meter scale. Such a photonic crystal may have an inhibition range to light, which is represented as a photonic bandgap or a PBG. That is, the photonic crystal is formed by periodically arranging dielectric substances so that the size and position of the photonic crystal varies according to a refractive index, a period, a shape of the periodic structure, and so forth. Due to these properties, photonic crystals are used in optical function devices, such as branching filters, optical waveguides, optical delay elements, lasers, etc.

A switching principle of a photonic crystal having properties as described above according to the present invention will now be explained. When the refractive index of the inner substance of the photonic crystal is changed so that the photonic crystal has a same refractive index as that of a surrounding substance, and when a position of an associated PBG changes to a position outside the wavelength range of the input optical signals, the photonic crystal lets the input optical signals pass through. On the other hand, when the refractive index does not change, and the PBG position is maintained, the photonic crystal reflects the input optical signals, and thereby a switching effect is obtained.

Methods for changing the refractive index of the inner substance of the photonic crystal include a method to change a temperature of the inner substance, a method to form an electric field in the inner substance, a method to apply optical signals to the inner substance, and a mechanical method.

Figure 3:
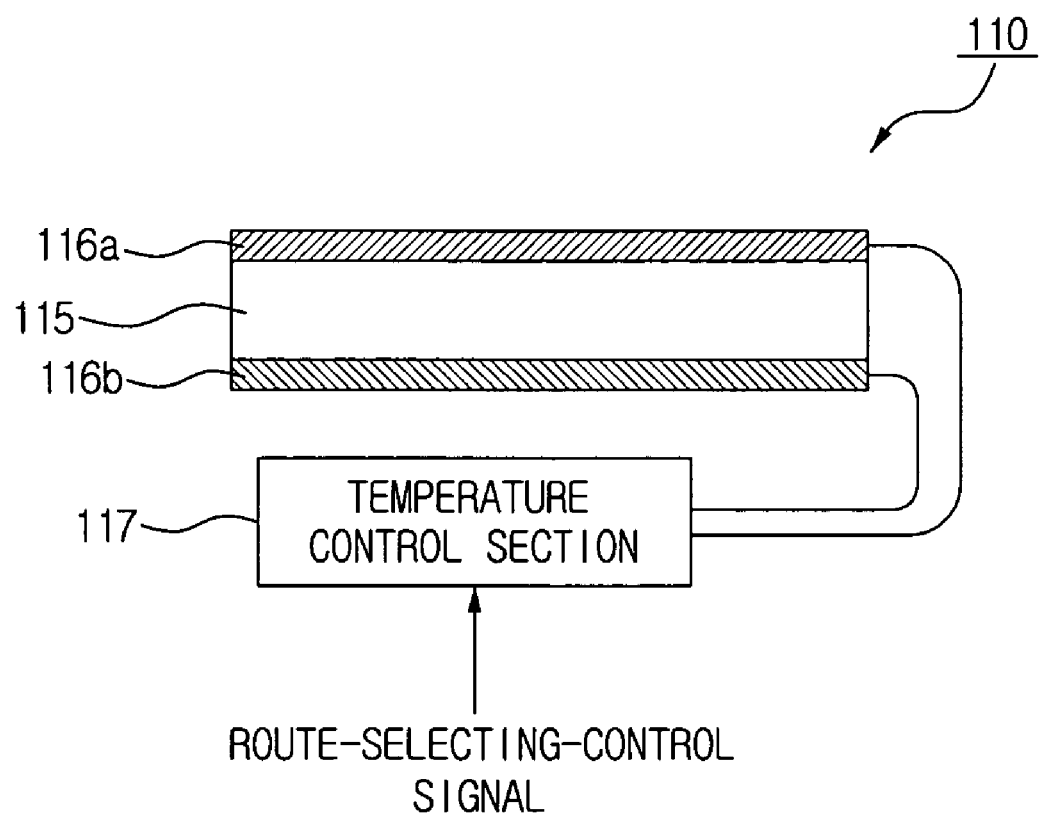
FIG. 3 illustrates a detailed view of a switching-control segment of FIG. 2B, in which the switching-control segment is controlled by temperature.

FIG. 3 illustrates a detailed view of a switching-control segment 110 of FIG. 2B, in which the switching-control segment is controlled by temperature. With reference to FIG. 3, an embodiment changing the refractive index of the inner substance by changing the temperature of the inner substance will now be described.

The switching-control segment 110 includes a photonic crystal 115, heating devices 116a and 116b, and a temperature control section 117. The heating devices 116a and 116b and the temperature control section 117 constitute a refractive index changing section.

The temperature control section 117 outputs temperature control signals for changing the temperature of the inner substance of the photonic crystal 115 corresponding to a route-selecting-control signal, and the temperature of the inner substance of the photonic crystal 115 is changed by operating the heating devices 116a and 116b according to the output temperature control signals.

The refractive index of the inner substance of the photonic crystal 115 made of a dielectric substance is changed in accordance with the temperature change thereof. Then, if the refractive index of the inner substance of the photonic crystal 115 is changed so that the photonic crystal 115 has the same refractive index as that of a surrounding substance or so that the position of the PBG changes to a position outside of the used wavelength range, the photonic crystal 115 lets the input optical signals pass through. On the other hand, if the refractive index is not changed and the PBG is maintained, the photonic crystal 115 reflects the input optical signals of the wavelength range corresponding to the PBG.

In a case that the method for controlling the refractive index of the photonic crystal 115 is an electric field, similar effects may be obtained by replacing the temperature control section 117 with an electric field control section and replacing the heating devices 116a and 116b with electrode plates.

Also, in a case that the method for controlling the refractive index of the photonic crystal is optical intensity, similar effects may be obtained by replacing the temperature control section 117 with an optical intensity control section and replacing the heating devices 116a and 116b with optical sources.

In accordance with another embodiment of the present invention, the switching control section 100 includes a drive section and four photonic crystals, each having a PBG for a wavelength range of an input optical signal. The drive section may perform the switching operation of state 2 as shown in FIG. 2B, in response to a route-selecting-control signal, by inserting each one of a pair of photonic crystals into an inner area of each of the first and the third waveguides 10 and 30, respectively, and by removing each of another pair of photonic crystals from the second and the fourth waveguides 20 and 40. On the other hand, the drive section may perform the switching operation of state 1 as shown in FIG. 2A by removing each of one pair of photonic crystals from the first and the third waveguides 10 and 30 and by inserting each one of another pair of photonic crystals into an inner area of each of the second and the fourth waveguides 20 and 40, respectively.

Figure 4A:
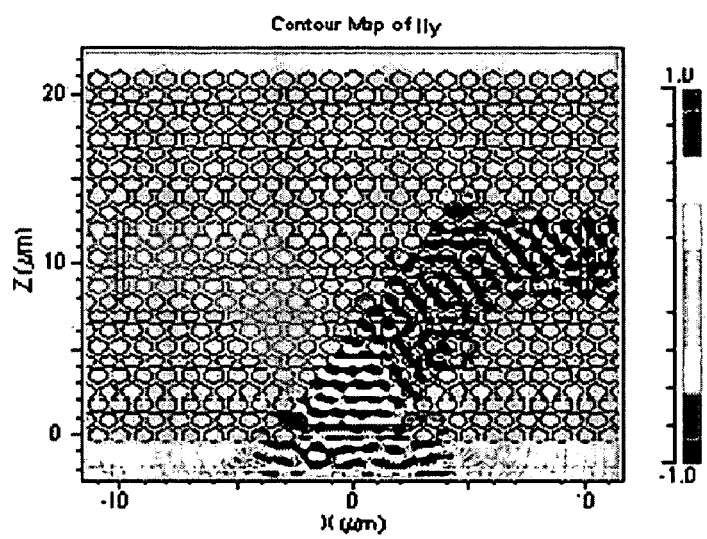
FIGS. 4A and 4B illustrate views for explaining a simulation based on Finite-Difference Time-Domain (FDTD), which represents switching effects in an optical switching apparatus according to the present invention.
Figure 4B:
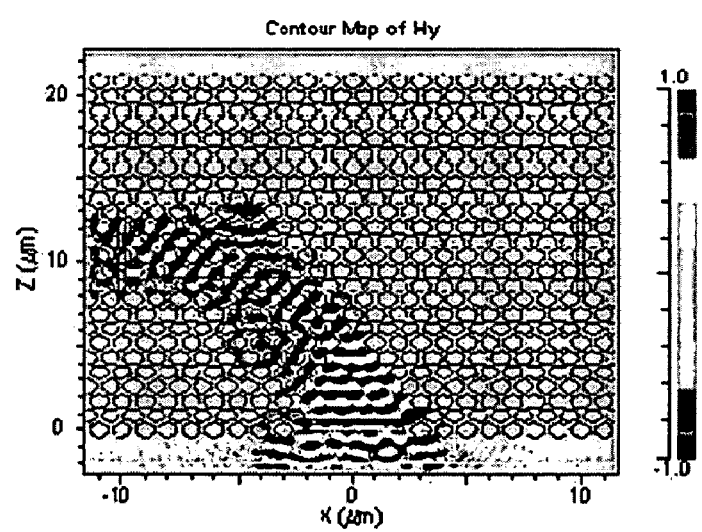

FIGS. 4A and 4B illustrate views for explaining a simulation based on Finite-Difference Time-Domain (FDTD), which represents switching effects of an optical switching apparatus according to the present invention. FIGS. 4A and 4B represent an optical switching effect in a case in which a normalized frequency of 0.35 is applied into a hole-type triangular photonic crystal structure having a PBG for a normalized frequency of 0.27 to 0.42. Referring to the drawings, an input port is positioned at the middle of a lower end in a switching apparatus, and one output port is positioned in the middle of both left and right ends of the switching apparatus. A waveguide width of the input port is 5a and a waveguide width of each output port is 4.3a, where "a" is a distance between a hole and an adjacent hole. The width of the input and output holes, and the distance therebetween, may be adjusted to change the PBG of the photonic crystal.

Referring to FIGS. 4A and 4B, in a case of a substrate having a refractive index of 3.376 with perforated air holes, when the refractive index of right air holes is controlled so as to have the same refractive index of 3.376 as that of the substrate, a waveguide is formed to the right side; thereby incident light is guided to the right side. Similarly, when the refractive index of left air holes is controlled so as to have the same refractive index of 3.376 as that of the substrate, a waveguide is formed to the left side; thereby incident light is guided to the left side. The refractive index inside the air holes may be controlled, for example, by adjusting the temperature or electromagnetic field of the photonic crystal. By the simulation, it is confirmed that the photonic crystal structure can be used as a switching apparatus provided a variation in refractive index is large enough and an operating time is short enough.

According to the present invention as described above, an optical-guide module and a switching control section are produced as a single body by the use of photonic crystals. Therefore, a 2×2 optical switching apparatus according to the present invention has a compact and simplified structure. Also, because there are no moving mechanical parts in the present invention, a reliable 2×2 optical switching apparatus may be obtained thereby. Particularly, such a 2×2 optical switching apparatus is valuable for forming an array in which smaller elements are desired, and the single-body structure of the 2×2 optical switching apparatus of the present invention makes integration thereof with other devices efficient. Such other devices may include a demultiplexer or a variable optical attenuator (VOA). Also, the optical switching apparatus of the present invention utilizes a complete PBG, which enables waveguides to be formed from a substance having no polarization dependence, thereby preventing generation of a problem due to polarization. Moreover, a variety of switching control sections, which use several control signals such as a heat signal, an electric signal or an optical signal, may be used selectively according to the properties of an applied device.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A 2×2 optical switching apparatus using photonic crystal structures, the apparatus comprising:
   an optical-guide module having a first, a second, a third and a fourth waveguide, the first and the second waveguides guiding a first optical signal of a first input port to a first and a second output port, respectively, the third and the fourth waveguides guiding a second optical signal of a second input port to the second and the first output ports, respectively, and formed with photonic crystals having a complete photonic bandgap for a wavelength range of the first and the second optical signals; and
   a switching control section controlling the first and the second optical signals to be respectively guided through any one route of a first/third waveguide route and a second/fourth waveguide route, according to a route-selecting-control signal inputted from outside the 2×2 optical switching apparatus, input ports and output ports being adjacent for both the first/third waveguide route and the second/fourth waveguide route.

2. The 2×2 optical switching apparatus using photonic crystal structures as claimed in claim 1, wherein the optical-guide module and the switching control section are formed as a single body.

3. The 2×2 optical switching apparatus using photonic crystal structures as claimed in claim 1, wherein the switching control section comprises:

a first pair of switching-control segments wherein each one of the first pair is positioned in an inner area of a respective one of the first and the third waveguides; and
a second pair of switching-control segments wherein each one of the second pair is positioned in an inner area of a respective one of the second and the fourth waveguides; wherein
any one pair of the first pair and the second pair of switching-control segments is selectively operated according to the route-selecting-control signal.

4. The 2×2 optical switching apparatus using photonic crystal structures as claimed in claim 1, wherein the switching control section further comprises:
   a photonic crystal having a controllable photonic bandgap; and
   a refractive index changing section for varying a refractive index of an inner substance of the photonic crystal according to the route-selecting-control signal.

5. The 2×2 optical switching apparatus using photonic crystal structures as claimed in claim 4, wherein the refractive index changing section comprises:
   a temperature control section for outputting temperature control signals for controlling a temperature of the inner substance of the photonic crystal according to the route-selecting-control signal; and
   at least one heating device for changing the temperature of the inner substance of the photonic crystal according to the temperature control signals.

6. The 2×2 optical switching apparatus using photonic crystal structures as claimed in claim 4, wherein the refractive index changing section comprises:
   an electric field control section for outputting electric field control signals for controlling an electric field intensity of the inner substance of the photonic crystal according to the route-selecting-control signal; and
   at least one electrode plate for controlling an electric field of the inner substance of the photonic crystal according to the electric field control signals.

7. The 2×2 optical switching apparatus using photonic crystal structures as claimed in claim 4, wherein the refractive index changing section comprises:
   an optical intensity control section for outputting optical intensity control signals for controlling an intensity of optical signals to be applied to the inner substance of the photonic crystal according to the route-selecting-control signal; and
   at least one optical source for applying optical signals having the intensity corresponding to the optical intensity control signals to the inner substance of the photonic crystal.

8. The 2×2 optical switching apparatus using photonic crystal structures as claimed in claim 1, wherein the switching control section further comprises:
   two pairs of photonic crystals having a complete photonic bandgap for a wavelength range of the first and the second optical signals; and
   a drive section for inserting and removing the two pairs of photonic crystals into and from the first, the second, the third and the fourth waveguides, respectively, according to the route-selecting-control signal.

9. The 2×2 optical switching apparatus using photonic crystal structures as claimed in claim 8, wherein the drive section for inserting and removing the two pairs of photonic crystals inserts each one of one pair of the photonic crystals into a respective one of each of the first and the third waveguides, and removes each one of the other pair of the photonic crystals from each of the second and the fourth waveguides, respectively.

10. The 2×2 optical switching apparatus using photonic crystal structures as claimed in claim 8, wherein the drive section for inserting and removing the two pairs of photonic crystals removes each one of one pair of the photonic crystals from each of the first and third waveguides, respectively, and inserts each one of the other pair of photonic crystals into a respective one of each of the second and the fourth wavegu ides.

11. The 2×2 optical switching apparatus using photonic crystal structures as claimed in claim 2, wherein the switching control section is positioned where none of the first through fourth waveguides overlap.

12. The 2×2 optical switching apparatus using photonic crystal structures as claimed in claim 1, wherein the first and third waveguide routes are not orthogonal and the second and fourth waveguide routes are not orthogonal.

13. The 2×2 optical switching apparatus using photonic crystal structures as claimed in claim 1, the first through fourth waveguides each including a portion having a real slope.

14. The 2×2 optical switching apparatus using photonic crystal structures as claimed in claim 1, the first through fourth waveguides each including a portion having a curve.

15. A 2×2 optical switching apparatus using photonic crystal structures, the apparatus comprising:
  a first input port and a second input port located opposite to each other;
  a first output port located adjacent the first and the second input ports;
  a second output port located opposite to the first output port;
  a photonic crystal optical-guide comprising a first waveguide route guiding a first optical signal of the first input port to the first output port, a second waveguide route guiding the first optical signal of the first input port to the second output port, a third waveguide route guiding a second optical signal of the second input port to the second output port, and a fourth waveguide route guiding the second optical signal of the second input port to the first output port, the photonic crystal optical-guide having complete a complete photonic bandgap for a wavelength range of the first and the second optical signals; and
  a switching control section controlling the first and the second optical signals to be respectively guided through any one route of a first/third waveguide route and a second/fourth waveguide route, according to a route-selecting-control signal inputted from outside the 2×2 optical switching apparatus.

16. The 2×2 optical switching apparatus using photonic crystal structures as claimed in claim 15, wherein the optical-guide and the switching control section are funned as a single body.

17. The 2×2 optical switching apparatus using photonic crystal structures as claimed in claim 16, wherein the switching control section is positioned where none of the first through fourth waveguides overlap.

18. The 2×2 optical switching apparatus using photonic crystal structures as claimed in claim 15, wherein the first and third waveguide routes are not orthogonal and the second and fourth waveguide routes are not orthogonal.

19. The 2×2 optical switching apparatus using photonic crystal structures as claimed in claim 15, the first through fourth waveguides each including a portion having a real slope.

20. The 2×2 optical switching apparatus using photonic crystal structures as claimed in claim 15, the first through fourth waveguides each including a portion having a curve.

* * * * *